(12) United States Patent
Ma et al.

(10) Patent No.: US 12,481,141 B2
(45) Date of Patent: Nov. 25, 2025

(54) COMPACT LASER SCANNING MICROSCOPE SYSTEM

(71) Applicant: Thorlabs, Inc., Newton, NJ (US)

(72) Inventors: Hongzhou Ma, Centreville, VA (US); Jeffery S. Brooker, Manassas, VA (US)

(73) Assignee: Thorlabs, Inc., Newton, NJ (US)

( * ) Notice: Subject to any disclaimer, the term of this patent is extended or adjusted under 35 U.S.C. 154(b) by 922 days.

(21) Appl. No.: 17/696,513

(22) Filed: Mar. 16, 2022

(65) Prior Publication Data

US 2022/0299742 A1  Sep. 22, 2022

Related U.S. Application Data

(60) Provisional application No. 63/163,419, filed on Mar. 19, 2021.

(51) Int. Cl.
| | |
|---|---|
| G02B 26/08 | (2006.01) |
| G02B 5/30 | (2006.01) |
| G02B 21/00 | (2006.01) |
| G02B 26/10 | (2006.01) |

(52) U.S. Cl.
CPC ....... *G02B 21/0048* (2013.01); *G02B 5/3016* (2013.01); *G02B 26/0833* (2013.01); *G02B 26/101* (2013.01)

(58) Field of Classification Search
CPC .............. G02B 21/0048; G02B 5/3016; G02B 26/0833; G02B 26/101; G02B 21/241;
(Continued)

(56) References Cited

U.S. PATENT DOCUMENTS

| | | |
|---|---|---|
| 2002/0041439 A1 | 4/2002 | Engelhardt et al. |
| 2009/0067315 A1* | 3/2009 | Park .................. G11B 7/127 369/124.02 |

(Continued)

FOREIGN PATENT DOCUMENTS

| | | |
|---|---|---|
| CN | 106461926 A | 2/2017 |
| CN | 109031678 A | 12/2018 |

(Continued)

OTHER PUBLICATIONS

Second Office Action issued by The China National Intellectual Property Administration for Chinese Patent Application No. 202210254571.2, dated Jun. 28, 2024.

(Continued)

*Primary Examiner* — Euncha P Cherry
(74) *Attorney, Agent, or Firm* — Myers Wolin, LLC

(57) ABSTRACT

A laser scanning imaging system including: a first beam scanner; a first set of relay lenses; a second beam scanner; a second set of relay lenses; an objective lens; wherein the first beam scanner is configured to receive an input laser beam and scan the laser beam about one or more axes; the first set of relay lenses is configured to expand the laser beam scanned by the first beam scanner and conjugate a scanning plane of the first beam scanner with a scanning plane of the second beam scanner; the second beam scanner is configured to scan the laser beam relayed by the first set of relay lenses about one or more axes; the second set of relay lenses is configured to expand the laser beam scanned by the second beam scanner and project the scanning plane of the second beam scanner to a pupil of the objective lens.

17 Claims, 12 Drawing Sheets

(58) Field of Classification Search
CPC ............ G02B 21/0036; G02B 21/0028; G02B 21/006; G02B 21/0068
See application file for complete search history.

(56) References Cited

U.S. PATENT DOCUMENTS

| | | | | |
|---|---|---|---|---|
| 2011/0096393 | A1* | 4/2011 | Araki | G02B 21/004 359/368 |
| 2019/0227290 | A1* | 7/2019 | Schwedt | G02B 21/0076 |
| 2020/0018962 | A1* | 1/2020 | Lu | G02B 27/0172 |
| 2020/0081237 | A1 | 3/2020 | Wald et al. | |
| 2021/0188467 | A1 | 6/2021 | Bocedi et al. | |

FOREIGN PATENT DOCUMENTS

| | | |
|---|---|---|
| CN | 111095073 A | 5/2020 |
| DE | 102017119478 A1 | 2/2019 |
| WO | 2020037941 A1 | 2/2020 |

OTHER PUBLICATIONS

Chen, H., et al., "High performance closed-loop control of a 2D MEMS micromirror with sidewall electrodes for a laser scanning microscope system", 2014 International Conference on Manipulation, Manufacturing and Measurement on the Nanoscale (3M-NANO), Oct. 27-31, 2014, pp. 12-17, IEEE, Taipei.

Zhou, Y., et al., "Adaptive optics two photon scanning laser fluorescence microscopy", MEMS Adaptive Optics V, 2011, pp. 79310H-1-79310H-8, vol. 7931, SPIE.

Chen, H., et al., "A Polarizer-Free Liquid Crystal Lens Exploiting an Embedded-Multilayered Structure", IEEE Photonics Technology Letters, Apr. 15, 2015, pp. 899-902, vol. 27, No. 8, IEEE.

Extended European Search Report with European search opinion issued by the European Patent Office for Application No. 22162612.0, mailed on Aug. 5, 2022.

First Office Action issued by the Chinese Patent Office for CN Patent Application No. 202210254571.2, dated Feb. 18, 2024.

Zhou, et al., "Adaptive optics two-photon scanning laser fluorescence microscopy", SPIE MOEMS-MEMS, 2011, pp. 1-9, vol. 7931, No. 79310H, SPIE, San Francisco, CA.

Chen, et al., "High performance closed-loop control of a 2D MEMS micromirror with sidewall electrodes for a laser scanning microscope", 2014 International Conference on Manipulation, Manufacturing and Measurement on the Nanoscale (3M-NANO), 2014, pp. 12-17, Oct. 2014, Taipei.

\* cited by examiner

COMPACT LASER SCANNING MICROSCOPE SYSTEM

CROSS REFERENCE TO RELATED APPLICATIONS

This application claims the benefit of U.S. Provisional Patent Application No. 63/163,419 filed on Mar. 19, 2021. The contents of U.S. Provisional Patent Application 63/163,419 are hereby incorporated by reference.

FIELD OF THE INVENTION

The invention generally relates to microscopic systems. More particularly, the invention relates to a laser scanning microscopic system that uses multiple conjugated relay pairs forming a compound set of beam expansion optics to enable the use of smaller scanners, fiber laser delivery or a more compact form factor for laser scanning microscope systems.

BACKGROUND

For in vivo imaging in the life science, there is growing needs for microscopy systems that are adaptable to the environment of live object being studied. It is imperative to have a multi-photon microscopic system that is compact, light-weighted, and spatially maneuverable for convenient access to various positions and angles.

SUMMARY

An embodiment of the present invention provides an imaging system that is compact, light-weighted, and spatially maneuverable. In one embodiment, the system is constructed with MEMS (micro-electromechanical system) scanners, robotic arm and fiber coupled ultrafast laser source. Note that the microscope is also referred to as a "Stick Scope" in this document.

One embodiment of the present invention provides a laser scanning imaging system including: a first beam scanner; a first set of relay lenses; a second beam scanner; a second set of relay lenses; and an objective lens; wherein the first beam scanner is configured to receive an input laser beam and scan the laser beam about one or more axes; wherein the first set of relay lenses is configured to expand the laser beam scanned by the first beam scanner and conjugate a scanning plane of the first beam scanner with a scanning plane of the second beam scanner; wherein the second beam scanner is configured to scan the laser beam relayed by the first set of relay lenses about one or more axes; and wherein the second set of relay lenses is configured to expand the laser beam scanned by the second beam scanner and project the scanning plane of the second beam scanner to a pupil of the objective lens.

One embodiment of the present invention provides a laser scanning imaging system including: a first beam scanner; a first set of relay lenses; a second beam scanner; a second set of relay lenses; a third beam scanner; a third set of relay lenses; and an objective lens; wherein the first beam scanner is configured to receive an input laser beam and scan the laser beam about one or more axes; wherein the first set of relay lenses is configured to expand the laser beam scanned by the first beam scanner and conjugate a scanning plane of the first beam scanner with a scanning plane of the second beam scanner; wherein the second beam scanner is configured to scan the laser beam relayed by the first set of relay lenses about one or more axes; wherein the second set of relay lenses is configured to expand the laser beam scanned by the second beam scanner and conjugate the scanning plane of the second beam scanner with a scanning plane of the third beam scanner; wherein the third beam scanner is configured to scan the laser beam relayed by the second set of relay lenses about one or more axes; and wherein the third set of relay lenses is configured to expand the laser beam scanned by the third beam scanner and project the scanning plane of the third beam scanner to a pupil of the objective lens.

One embodiment of the present invention provides a laser scanning imaging system including: a liquid crystal polarization zone plate (LCPZP) lens stack; a first set of relay lenses; a beam scanner; a second set of relay lenses; and an objective lens; wherein the LCPZP lens is configured to receive an input laser beam and shift a focus of the laser beam; wherein the first set of relay lenses is configured to receive the laser beam from the LCPZP lens and to expand the laser beam so as to match the an aperture of the LCPZP with an aperture of the beam scanner; wherein the beam scanner is configured to scan the laser beam relayed by the first set of relay lenses about one or more axes; and wherein the second set of relay lenses is configured to expand the laser beam scanned by the beam scanner and project the scanning plane of the beam scanner to a pupil of the objective lens.

DETAILED DESCRIPTION OF THE PREFERRED EMBODIMENTS

Figure 1:
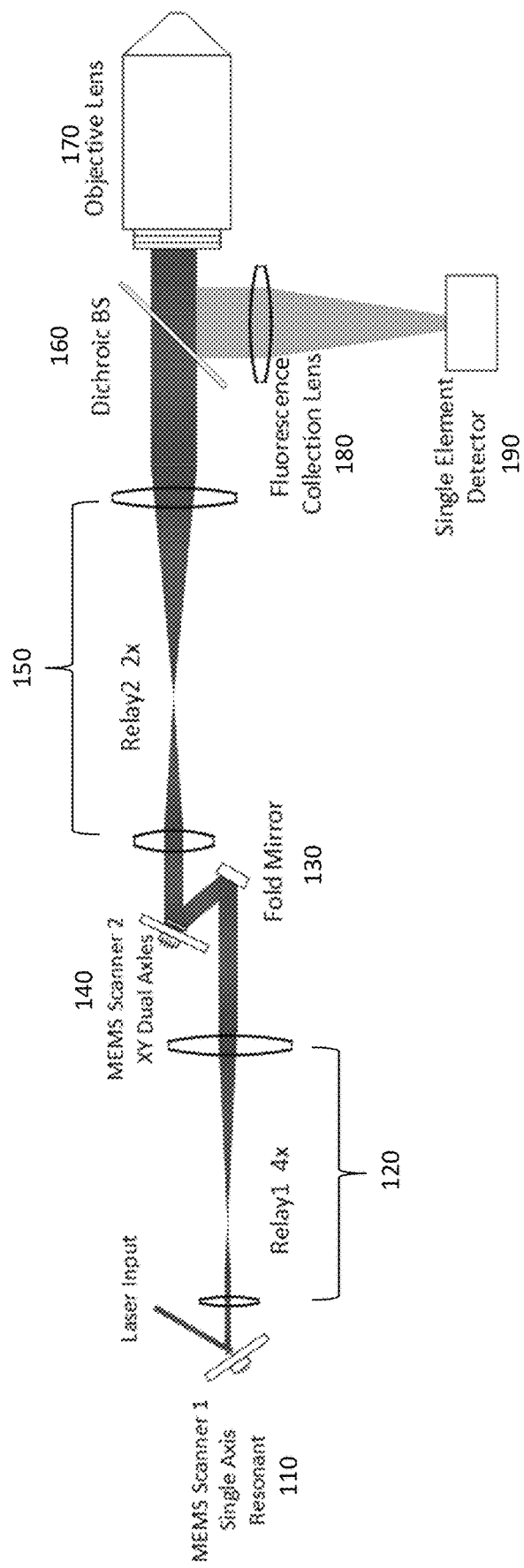
FIG. 1 shows the optical path of a laser scanning system according to an embodiment of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The optical path of a laser scanning microscopic system according to an embodiment of the present invention is shown in FIG. 1. An input laser light enters the system and the light is received and scanned by a scanner 110. The scanner may be a single-axis scanner, and may also be a dual-axis scanner. The light passes through the relay 120 and then is reflected by a fold mirror 130 to a dual-axis scanner 140. The fold mirror makes the microscope system alignable. The light scanned by the dual-axis scanner 140 then passes through the relay 150, through a dichroic beam splitter 160 and then to the objective lens 170. An optomechanical component (not shown) may be used for input laser alignment control, for example, a kinematic mount for fiber collimator configured to direct the light to single-axis scanner in the microscope.

In one embodiment, the microscope may be used for multiphoton EPI fluorescence detection with the non-descanned detection scheme. The objective lens focuses the scanned light onto a sample. The sample interacts with the incident light and emits fluorescence light back into the objective lens 170. The dichroic beam splitter 160 is placed next to the objective pupil to deflect the fluorescence signal sideways. A lens or set of lenses 180 focus the fluorescence light into a photo detector 190, e.g., a Photomultiplier Tube, or a Silicon Photomultiplier Tube.

Figure 7:
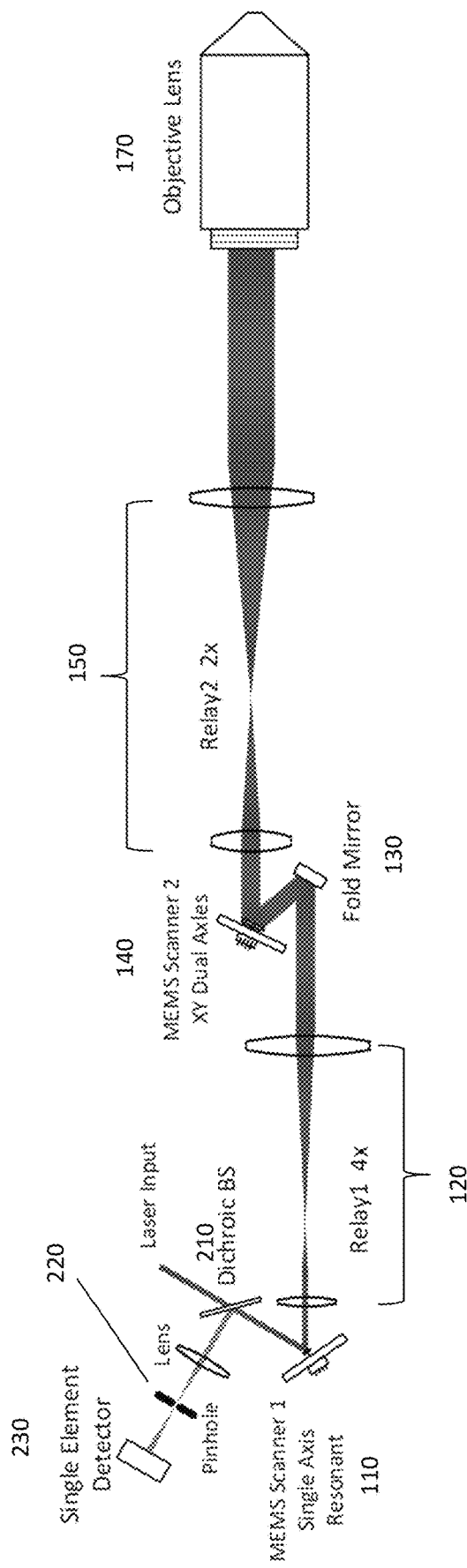
FIG. 7 shows the optical path of a confocal laser scanning system according to an embodiment of the present invention.

The optical path of a confocal microscopic system according to an embodiment of the present invention is shown in FIG. 7. An input laser light enters the confocal microscopic system, and the light passes through a beam splitter 210, and then is received and scanned by a scanner 110. The scanner may be a single-axis scanner, and may also be a dual-axis scanner. The light passes through the relay 120 and then is reflected by a fold mirror 130 to a dual-axis scanner 140. The light scanned by the dual-axis scanner 140 then passes through the relay 150, and then to the objective lens 170. Light signal received from the objective lens 170 is de-scanned back to the optical path, the light signal is deflected by the beam splitter 210, through a lens and a pinhole 220, and the light signal is detected by a detector 230.

The key elements in the above systems according to an embodiment are two MEMS scanners. The first MEMS scanner is a single-axis resonant scanner, and may also be a dual-axis scanner. It has a smaller sized mirror with diameter of about 1.2 to 2 millimeters. The smaller mirror, hence lighter weight and lower inertia has a higher resonant frequency in the range of 4-12 kHz. When driving the mirror at a resonant frequency, the mirror is also able to tilt in larger mechanical angles of +/−8 degrees (optical+/−16 degrees). The second MEMS scanner is a dual-axes point-to-point scanner. It has a mirror with diameter of about 5 millimeters which has a tilt angle of up to +/−5 degrees (optical+/−10 degrees) in both X and Y directions. The scanning planes of the two MEMS scanners are optically conjugated with a 4f relay lens system with a magnification ratio, e.g., 1:4. After the second MEMS scanner, a second relay lens system is inserted which projects the scanning plane on to the entrance pupil of a microscope objective lens.

An important feature in an embodiment of the present invention is that the beam expansion is different between first mirror in the first scanner and the mirror in the second scanner. This arrangement not only creates a conjugated pair but also allows the mirror in the first scanner to be significantly smaller, and then the conjugation between the mirrors not only conjugates the mirrors, but also allow the system to act as a scan lens and a beam telescope. This use of a small mirror in the first scanner allows the use of the MEMS device that is significantly simpler to use and still has similar performance. This creates a much more compact and less complex system.

In one embodiment, one or more additional MEMS scanners and relay systems are used to further extend the length of the imaging system. For example, in a system with 3 MEMS scanners, a first beam scanner scans the laser beam about one or more axes, and a first set of relay lenses conjugates a scanning plane of the first beam scanner with a scanning plane of a second beam scanner. The second beam scanner scans the light about one or more axes, and a second set of relay lenses conjugates a scanning plane of the second beam scanner with a scanning plane of a third beam scanner. The third beam scanner scan the light about one or more axes, and a third set of relay lenses projects the scanning plane of the third beam scanner to a pupil of the objective lens. Although not shown, it is understood that the arrangement of the one or more additional MEMS scanners and relay systems is similar to repeats of the arrangement of the second MEMS scanner and second set of relay lenses shown in FIGS. 1 and 7-9.

A system according to an embodiment has three imaging modes. The first one is fast raster scanning mode that runs at video frame rates. In this mode the first MEMS scans in resonant mode in the fast X axis. The second MEMS scans in the slow Y axis. With proper electronics control, the raster scan can run at 30-45 frames per second (fps) for image pixel size of 512×512. The second mode is slow point-to-point scanning. In this mode, the first MEMS is kept static at the center. The second MEMS scans in both the X and Y directions to construct an image. While the point-to-point mode scans in slower frame rate of 2 or 3 fps for 512×512 image size, it provides larger field of view, is more flexible at pixel dwell time, and is capable of random shaped ROI scans. In the third mode, multiple raster scans can be taken within a given FOV to increase frame rate on a subset of the area. This is commonly done with X- and Y-resonant scanning systems.

Scanning Optics

Figure 2:
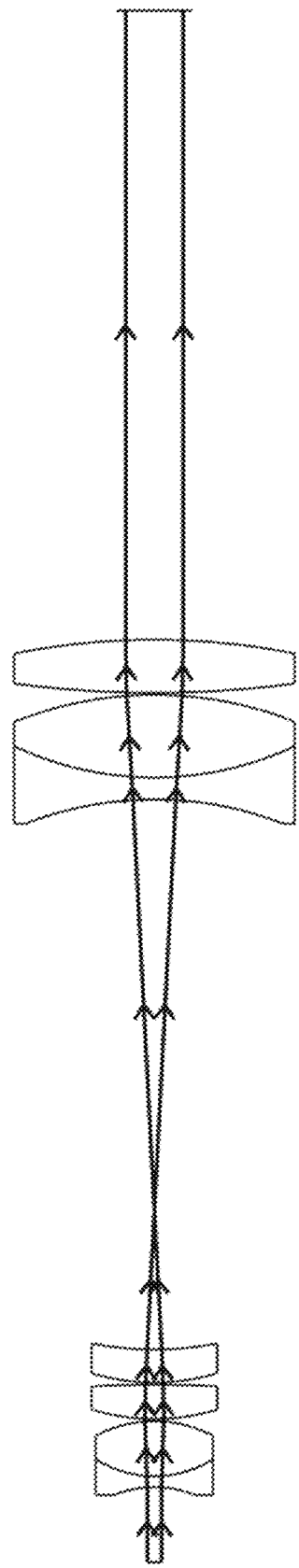
FIG. 2 shows a relay in a laser scanning system according to an embodiment of the present invention.
Figure 3:
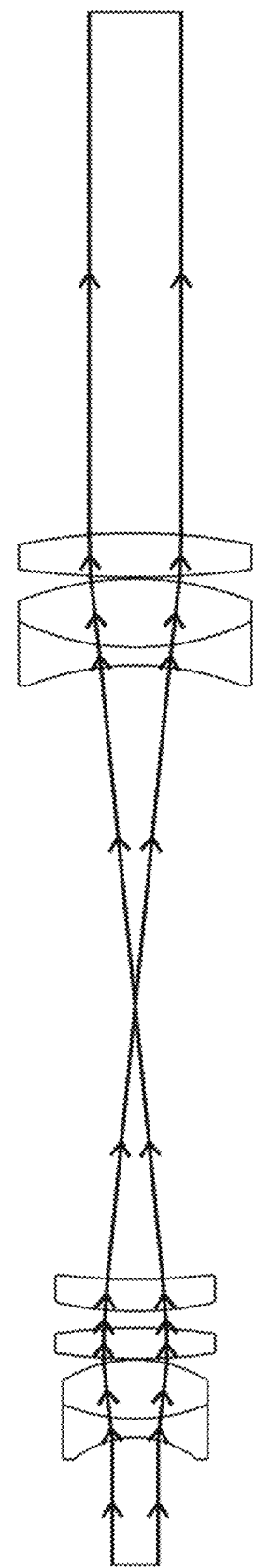
FIG. 3 shows a relay in a laser scanning system according to an embodiment of the present invention.

For best imaging resolution and 2-photon excitation efficiency, the optics system is required to be diffraction limited. FIGS. 2 and 3 show the example layout of relay 1 and relay 2. Both are achromatic corrected for 910-950 nm and are diffraction limited.

FIG. 2 shows an example embodiment of a relay with 1:4 beam expansion. Relay 1 consists of a scan lens with effective focal length of 12.5 mm, and a tube lens with effective focal length of 50 mm. It has an entrance pupil diameter of 1.3 mm and exit pupil diameter of 5.2 mm. It allows scan angle of up to +/−16 degrees that matches the scan range of the resonant MEMS scanner.

FIG. 3 shows an example embodiment of a relay with 1:2 beam expansion. Relay 2 consists of a scan lens with effective focal length of 25 mm, and a tube lens with effective focal length of 50 mm. It has an entrance pupil diameter of 5 mm and exit pupil diameter of 10 mm. It allows scan angle of up to +/−7.5 degrees. At the exit pupil, the scan angle reduces by half to +/−3.75 degrees which matches most commercial objective lens entrance angle.

Figure 4:
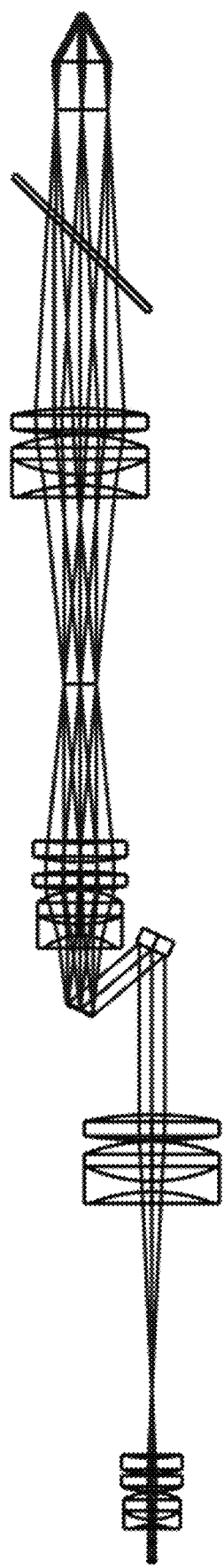
FIG. 4 shows the optics layout in a laser scanning system according to an embodiment of the present invention.
Figure 5:
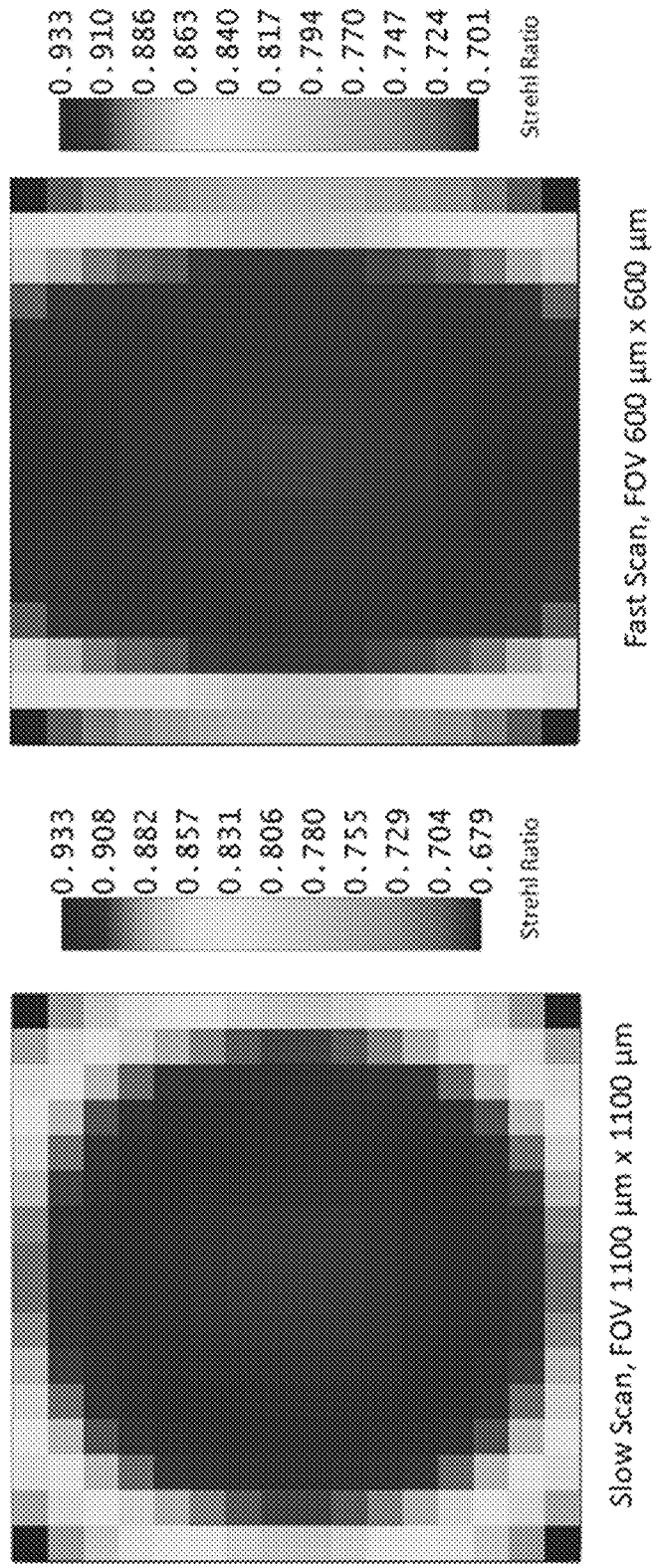
FIG. 5 shows the simulated Strehl ratio of a laser scanning system according to an embodiment of the present invention.

FIG. 4 shows the layout of the whole optical system of stick scope. A paraxial lens representing an ideal objective lens is inserted at the end of the layout for simulation purpose. The Strehl ratio at various field location is plotted as a 2D map as shown in FIG. 5.

System Specification

The following is an example system specification of a microscope according to an embodiment.
Assuming a 20× objective lens with focal length of 9 mm:
Fast Scan FOV: 600 μm (424 μm×424 μm)
Slow Scan FOV: 1 mm (700 μm×700 μm)
Input beam: φ1.25 mm max
Effective NA: 0.53
Designed wavelength: 910 nm-950 nm Laser Source and Fiber Coupling In one embodiment, the laser is delivered to the system through a Photonic Crystal Hollow Core fiber which guarantees high throughput and manageable group delay dispersion. The optics fiber is essential to allow 6-degree freedom of maneuverability of the Stick Scope.

Mechanical System and Robotic Arm

Figure 6:
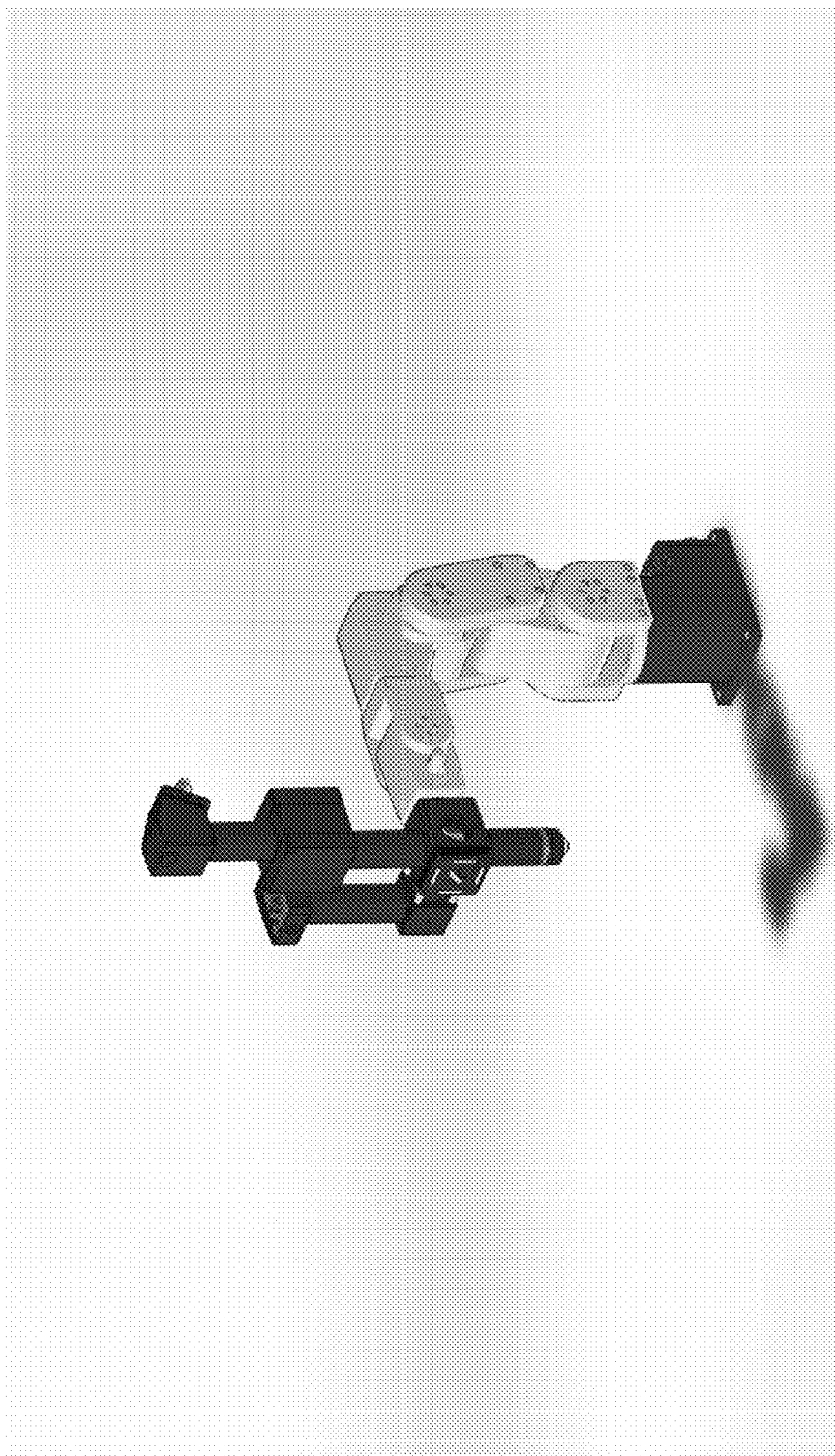
FIG. 6 shows a laser scanning system mounted on a robotic arm according to an embodiment of the present invention.

Some advantages of the microscope according to an embodiment include light weight and compact size, and the Stick Scope can be mounted and maneuvered by a desktop robotic arm, as shown in FIG. 6, for example.

MEMS Scanner Position Tracking

Figure 8:
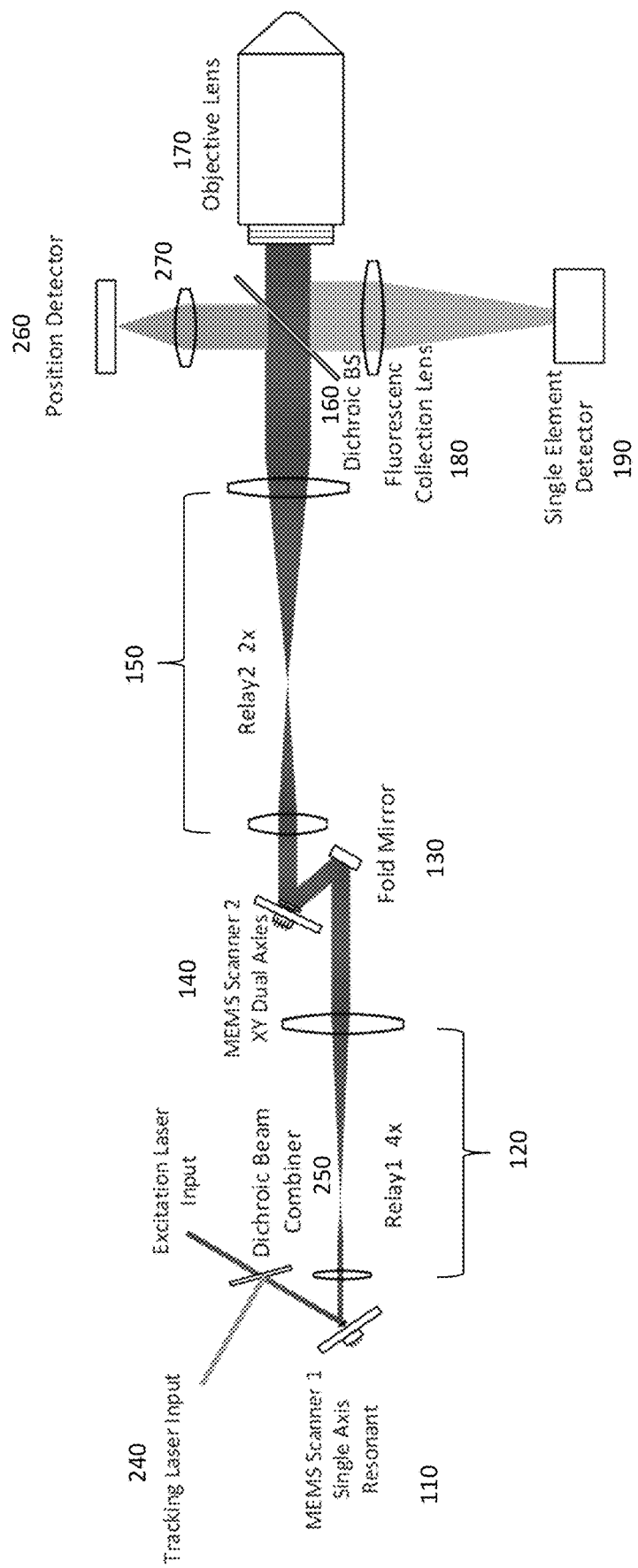
FIG. 8 shows the optical path of a laser scanning system with MEMS scanner position tracking according to an embodiment of the present invention.

According to one embodiment, an additional laser 240 can be added to track the scanning position to close the loop of MEMS mirror control, so as to allow for precise control of the MEMS scanner amplitude, scan angle or phase. For example, a low power continuous wave visible or NIR laser can be chosen for such task. As shown in FIG. 8, a dichroic beam combiner 250 directs the tracking laser beam into the optical path of the laser scanning imaging system. The tracking laser beam can be extracted out of the optical path at a desired location. In one embodiment, a position detector (PSD) 260, after a focus lens 270, can be placed next to the dichroic BS 160 opposite to the fluorescence detector 190 to detect the tracking laser beam. With the PSD and appropriate control electronic circuitry for the MEMS scanners, the system can track the angle of each MEMS mirror in real time, and allow the control electronic circuitry to compensate the thermal drift due to ambient temperature fluctuation or excitation laser power modulation.

Liquid Crystal Polarization Zone Plate (LCPZP)

LCPZPs consist of a nematic liquid crystal (LC) film that is surface aligned to present a permanent, continuously varying concentric polarization grating pattern. The pattern is arranged to act as diffractive lens. Note that the use of LCPZPs for beam steering stages has been discussed in US 2021/0188467 A1. For incident light with one handedness of circular polarization, an LCPZP will cause the incident beam to focus while for the opposite handedness the light passing through the LCPZP the light will diverge. Consequently, the focus of an LCPZP can be adjusted by changing the handedness of the incident circularly polarized light. Thus, by inserting a stack of a LC half-wave switch sandwiched between multiple LCPZPs with chosen powers, one can create a switchable variable focal length lens. This technique can be incorporated in the embodiments discussed above to add fast laser focus control along the axis of the objective for three-dimensional image acquisition.

Figure 9:
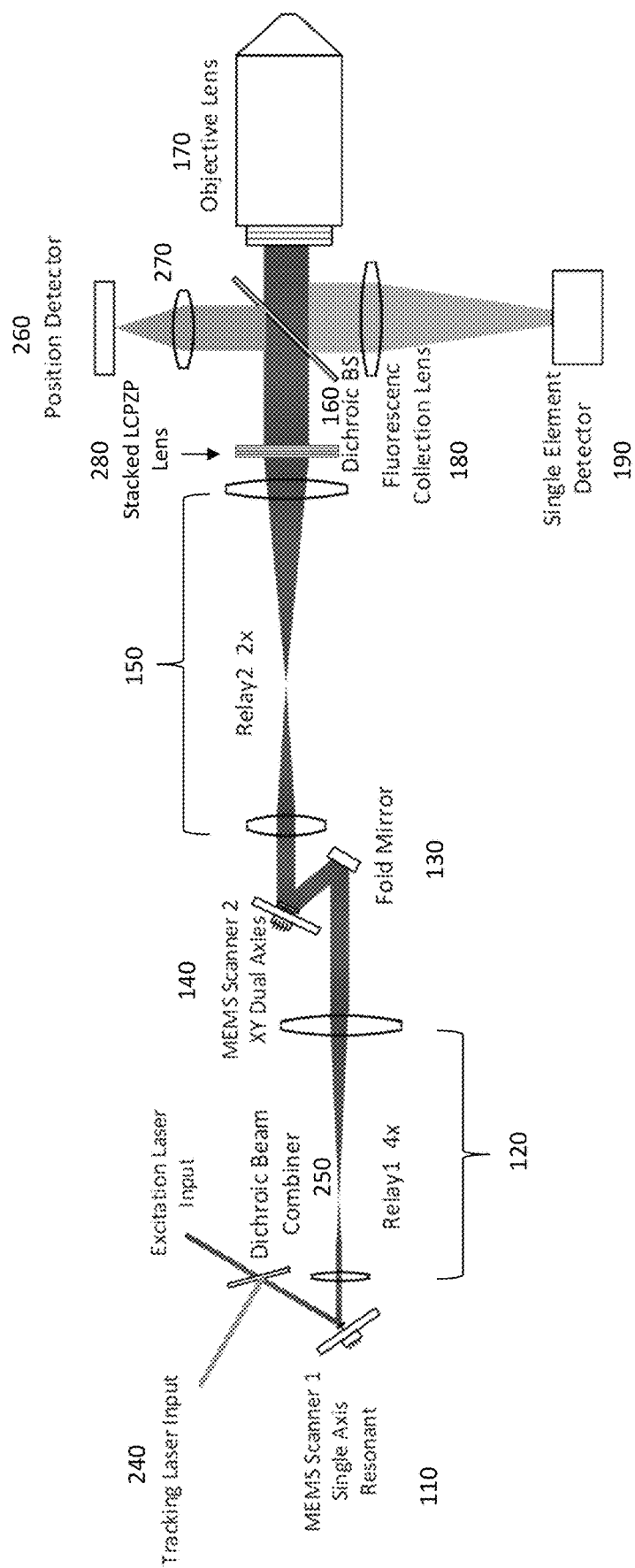
FIG. 9 shows a LCPZP lens positioned in a laser scanning system according to an embodiment of the present invention.
Figure 10:
FIG. 10 shows an image of 16 discrete focal points along the optical axis, with a 4 stage LCPZP lens before a 10× objective according to an embodiment of the present invention.

As shown in FIG. 9, according to one embodiment, the LCPZP lens stack 280 is placed after the relay 2 tube lens 150 and before the dichroic beam splitter 160. With such a configuration, the LCPZP can control the divergence of excitation laser without compromising the fluorescence signal collection throughput. The number of discrete focal plane of a LCPZP lens is $2^N$, where N is the number of stages in the LCPZP lens. FIG. 10 shows the two-photon excitation foci in a fluorescein dye pool, using a four stage LCPZP lens and a 10× objective. In FIG. 10, 16 discrete foci were recorded one by one but rendered in one image.

There are several advantages to use LCPZP lens for focus control in the laser scanning imaging system according to an embodiment:
Light weighted and smaller form factor to fit in the compact microscope system.
Fast focus switching in a few milliseconds.
No mechanical moving parts.

Figure 11:
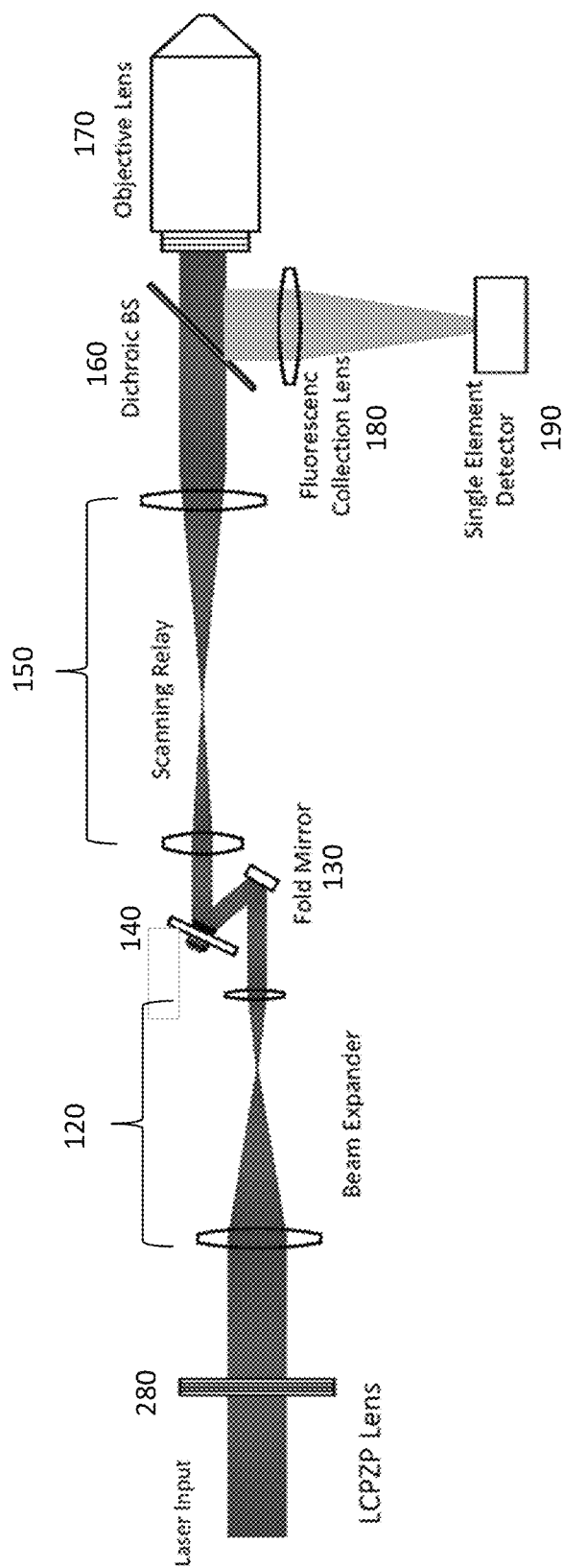
FIG. 11 shows a LCPZP lens placed prior to the scanner for remote focus control according to an embodiment of the present invention.

Another configuration for implementation of LCPZP lens, and not restricted to the compact system described in this context, is to place the LCPZP lens prior to the scanning mirrors. FIG. 11 shows a scanning system with one set of scanning mirrors and the position that LCPZP lens 280 can be arranged to provide focus control remotely according to an embodiment. A relay 120 can be used between the LCPZP lens 280 and the scanning mirror 140 to match the apertures of the two. An input laser light enters the system and the light passes through the LCPZP lens 280 and the relay 120, and then is reflected by a fold mirror 130 to a scanner 140. The light scanned by the scanner 140 then passes through the relay 150, through a dichroic beam splitter 160 and then to the objective lens 170. In one embodiment, the scanning system may be used for multiphoton EPI fluorescence detection with the non-descanned detection scheme. The objective lens focuses the scanned light onto a sample. The sample interacts with the incident light and emits fluorescence light back into the objective lens 170. The dichroic beam splitter 160 is placed next to the objective pupil to deflect the fluorescence signal sideways. A lens or set of lenses 180 focus the fluorescence light into a photo detector 190.

Figure 12:
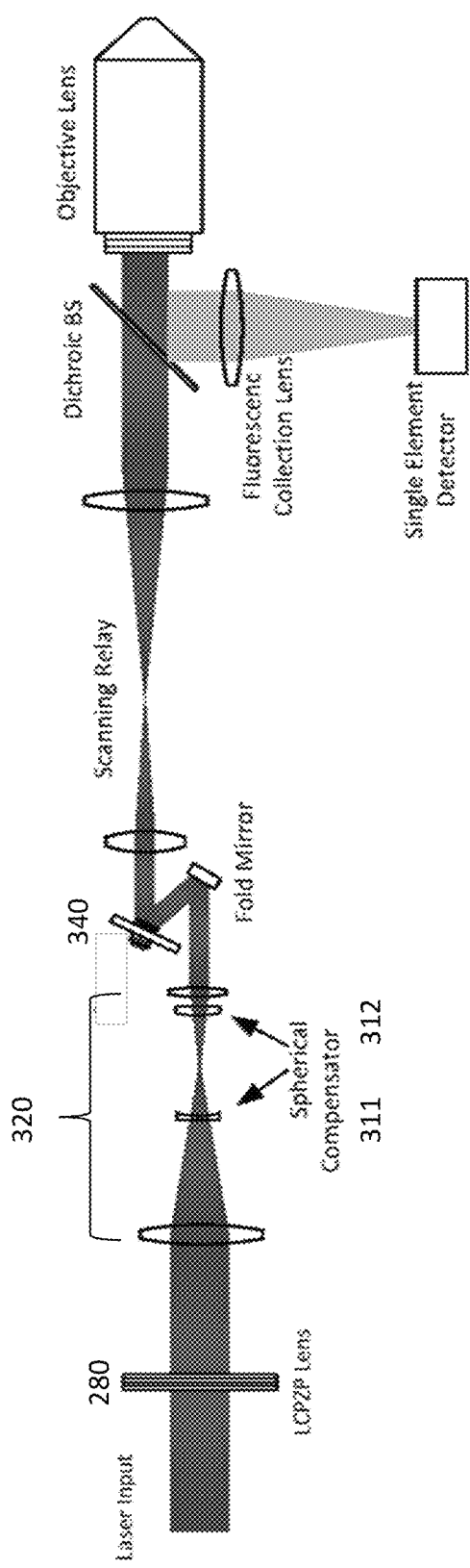
FIG. 12 shows a LCPZP lens remote focus control with wave front spherical aberration compensators according to an embodiment of the present invention.

Since the beam focus is shifted away from the nominal focal plane of the objective lens by the LCPZP lens, there will have certain amount of spherical aberrations. In the case that such aberration is a concern, a pair of spherical compensators 291, 292 can be introduced in the optical relay to pre-compensate and improve the final PSF quality, as shown in FIG. 12 according to an embodiment.

Figure 13:
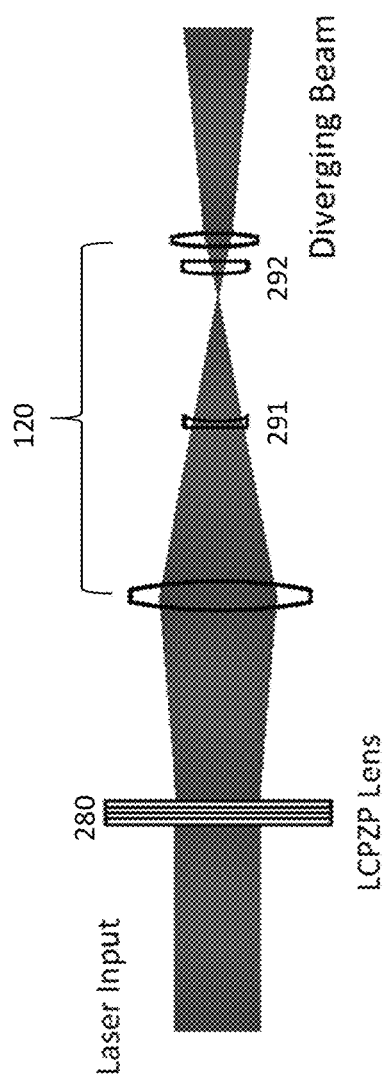
FIG. 13 shows the pre-compensate spherical aberration introduced with diverging beam according to an embodiment of the present invention.
Figure 14:
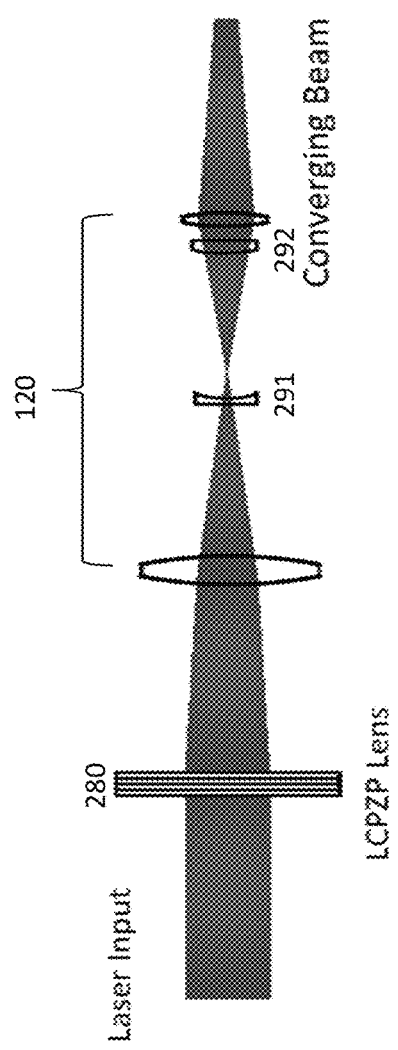
FIG. 14 shows the pre-compensate spherical aberration introduced with converging beam according to an embodiment of the present invention.

A pair of aspherical lenses separated by certain distance work as spherical aberration compensator. The separation is fixed so there is no mechanical moving part needed. The aspherical surface of the two compensators is customized such that one compensates positive spherical wave front aberrations and the other compensates negative spherical aberrations. In the neutral LCPZP power condition, the beam width going through the surfaces of the two compensators are identical, thus the positive and negative compensation cancels each other. In the negative LCPZP power condition, the beam diverges and consequently the beam width at the negative (concave) compensator is greater than that at the positive (convex) compensator as illustrated in FIG. 13. The net spherical aberration compensation is negative. In the positive LCPZP power condition, the beam converges and consequently the beam width at the negative (concave) compensator is less than that at the positive (convex) compensator as illustrated in FIG. 14. Thus the net spherical aberration compensation is positive.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A laser scanning imaging system comprising:
a first beam scanner;
a first set of relay lenses;
a second beam scanner;
a second set of relay lenses; and
an objective lens;
wherein the first beam scanner is configured to receive an input laser beam and scan the laser beam about one or more axes;
wherein the first set of relay lenses is configured to expand the laser beam scanned by the first beam scanner and conjugate a scanning plane of the first beam scanner with a scanning plane of the second beam scanner;
wherein the second beam scanner is configured to scan the laser beam relayed by the first set of relay lenses about one or more axes;
wherein the second set of relay lenses is configured to expand the laser beam scanned by the second beam scanner and project the scanning plane of the second beam scanner to a pupil of the objective lens; and
wherein the first beam scanner is a resonant microelectromechanical system MEMS) device that scans in a single axis;
the second beam scanner is a non-resonant MEMS device that scans in two axes, one of which is parallel to the scan axis of the first beam scanner.

2. The system of claim 1, further comprising a fiber coupling to an optomechanical component configured to direct the input light from a laser source.

3. The system of claim 2, further comprising a beam splitter situated next to the pupil of the objective lens configured to deflect a light signal received from the objective lens out of the optical path, and one or more collection lens configured to focus the deflected light signal into a photo detector.

4. The system of claim 2, further comprising a beam splitter situated between the fiber input and the first scanner configured to deflect a de-scanned light signal from the objective lens to a pinhole assembly comprising a pinhole configured to restrict the light to that which is coming from the focal point of the objective.

5. The system of claim 1, further comprising:
a tracking laser beam source;
a position detector;
a beam combiner configured to combine and direct the input laser beam and the tracking laser beam onto the first beam scanner;
a beam splitter configured to deflect the tracking laser beam out of the optical path; and
a lens configured to focus the deflected tracking laser beam into the position detector.

6. The system of claim 5, further comprising control circuitry configured to control the first and second scanners based on a signal detected by the position detector.

7. The system of claim 3, further comprising a liquid crystal polarization zone plate (LCPZP) lens stack situated between the second set of relay lenses and the beam splitter.

8. The system of claim 7, wherein the LCPZP lens stack comprises N stages configured to provide $2^N$ discrete focal planes.

9. A laser scanning imaging system comprising:
a first beam scanner;
a first set of relay lenses;
a second beam scanner;
a second set of relay lenses;
a third beam scanner;
a third set of relay lenses; and
an objective lens;
wherein the first beam scanner is configured to receive an input laser beam and scan the laser beam about one or more axes;
wherein the first set of relay lenses is configured to expand the laser beam scanned by the first beam scanner and conjugate a scanning plane of the first beam scanner with a scanning plane of the second beam scanner;
wherein the second beam scanner is configured to scan the laser beam relayed by the first set of relay lenses about one or more axes;
wherein the second set of relay lenses is configured to expand the laser beam scanned by the second beam scanner and conjugate the scanning plane of the second beam scanner with a scanning plane of the third beam scanner;
wherein the third beam scanner is configured to scan the laser beam relayed by the second set of relay lenses about one or more axes; and wherein the third set of relay lenses is configured to expand the laser beam scanned by the third beam scanner and project the scanning plane of the third beam scanner to a pupil of the objective lens;

wherein the first beam scanner is a resonant micro-electromechanical system (MEMS) device that scans in a single axis;

the second beam scanner is a non-resonant MEMS device that scans in two axes, one of which is parallel to the scan axis of the first beam scanner;

the third beam scanner is a non-resonant MEMS device that scans in two axes, one of which is parallel to the scan axis of the first beam scanner, or one of which is parallel to one of the scan axes of the second beam scanner.

10. The system of claim 9, further comprising a fiber coupling to an optomechanical component configured to direct the input light from a laser source.

11. The system of claim 10, further comprising a beam splitter situated next to the pupil of the objective lens configured to deflect a light signal received from the objective lens out of the optical path, and one or more collection lens configured to focus the deflected light signal into a photo detector.

12. The system of claim 10, further comprising a beam splitter situated between the fiber input and the first scanner configured to deflect a de-scanned light signal from the objective lens to a pinhole assembly comprising a pinhole configured to restrict the light to that which is coming from the focal point of the objective.

13. The system of claim 9, further comprising:
a tracking laser beam source;
a position detector;
a beam combiner configured to combine and direct the input laser beam and the tracking laser beam onto the first beam scanner;
a beam splitter configured to deflect the tracking laser beam out of the optical path; and
a lens configured to focus the deflected tracking laser beam into the position detector.

14. The system of claim 13, further comprising control circuitry configured to control the first, second and third scanners based on a signal detected by the position detector.

15. The system of claim 11, further comprising a liquid crystal polarization zone plate (LCPZP) lens stack situated between the third set of relay lenses and the beam splitter.

16. The system of claim 15, wherein the LCPZP lens stack comprises N stages configured to provide $2^N$ discrete focal planes.

17. A laser scanning imaging system comprising:
a liquid crystal polarization zone plate (LCPZP) lens stack;
a first set of relay lenses;
a beam scanner;
a second set of relay lenses; and
an objective lens;
wherein the LCPZP lens is configured to receive an input laser beam and shift a focus of the laser beam;
wherein the first set of relay lenses is configured to receive the laser beam from the LCPZP lens and to expand the laser beam so as to match an aperture of the LCPZP with an aperture of the beam scanner;
wherein the beam scanner is configured to scan the laser beam relayed by the first set of relay lenses about one or more axes; and
wherein the second set of relay lenses is configured to expand the laser beam scanned by the beam scanner and project the scanning plane of the beam scanner to a pupil of the objective lens; and
the system further comprising a pair of spherical compensators configured to compensate spherical aberrations associated with the laser beam focus being shifted away from the nominal focal plane of the objective lens by the LCPZP lens;
wherein in the pair of spherical compensators, one is configured to compensate positive spherical wave front aberrations and the other is configured to compensate negative spherical aberrations, such that: (a) in a neutral LCPZP power condition, the positive and negative compensation cancels each other, (b) in a negative LCPZP power condition, the negative compensation is greater than the positive compensation, and (c) in a positive LCPZP power condition, the negative compensation is less than the positive compensation.

* * * * *